(12) United States Patent
Agliata

(10) Patent No.: US 10,333,112 B2
(45) Date of Patent: Jun. 25, 2019

(54) RECLOSER BATTERY ASSEMBLY

(71) Applicant: Hubbell Incorporated, Shelton, CT (US)

(72) Inventor: Peter M. Agliata, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 225 days.

(21) Appl. No.: 15/584,917

(22) Filed: May 2, 2017

(65) Prior Publication Data

US 2017/0316908 A1 Nov. 2, 2017

Related U.S. Application Data

(60) Provisional application No. 62/330,355, filed on May 2, 2016.

(51) Int. Cl.
*H01M 2/34* (2006.01)
*H01H 7/04* (2006.01)
(Continued)

(52) U.S. Cl.
CPC .......... *H01M 2/043* (2013.01); *H01H 31/006* (2013.01); *H01H 75/04* (2013.01);
(Continued)

(58) Field of Classification Search
CPC ............. H01M 2/043; H01M 2200/00; H01M 2200/20; H01M 2/34; H01M 2/1016; H01M 2/022; H02H 7/26; H01H 31/006; H01H 75/04; H02J 7/241; H02J 7/0026; H01R 11/14; H01R 4/22; F16B 31/027
See application file for complete search history.

(56) References Cited

U.S. PATENT DOCUMENTS 2,542,132 A * 2/1951 Goertzen ............... H01H 35/02
200/61.51
4,581,504 A * 4/1986 Hamel, Sr. ........... H01H 35/146
200/61.08
(Continued)

OTHER PUBLICATIONS

VERSA-TECH Single-Phase Recloser for Distribution Systems, Hubbell. Maintenance Manual. Mar. 30, 2015 <URL: http://www.hubbellpowersystems.com/resources/instructions/chance-construction/pdf/PSP862-0311.pdf> (41 pages).
(Continued)

*Primary Examiner* — Muhammad S Siddiquee
(74) *Attorney, Agent, or Firm* — Michael Best & Friedrich, LLP

(57) ABSTRACT

A circuit interrupting device for use with a electrical power distribution system includes a housing containing a circuit interrupting mechanism. A battery tube is positioned in the housing. A battery assembly is configured to be inserted into the battery tube. The battery assembly includes a battery assembly body having a first end and a second end. A battery is positioned in the battery assembly body. The battery assembly is configured such that both a positive contact and a negative contact are exposed from the second end of the battery assembly body. In some embodiments, the battery assembly includes a keyed portion mates with the battery tube to ensure alignment of the battery assembly in the battery tube.

19 Claims, 9 Drawing Sheets

(51) Int. Cl.
- *H01M 2/04* (2006.01)
- *H02J 7/00* (2006.01)
- *H02J 7/24* (2006.01)
- *H01H 75/04* (2006.01)
- *H01H 31/00* (2006.01)
- *H02H 7/26* (2006.01)
- *H01M 2/02* (2006.01)
- *H01R 4/22* (2006.01)
- *H01R 11/14* (2006.01)
- *F16B 31/02* (2006.01)
- *H01M 2/10* (2006.01)

(52) U.S. Cl.
CPC .............. *H01M 2/34* (2013.01); *H02H 7/26* (2013.01); *H02J 7/0026* (2013.01); *H02J 7/241* (2013.01); *F16B 31/027* (2013.01); *H01M 2/022* (2013.01); *H01M 2/1016* (2013.01); *H01M 2200/00* (2013.01); *H01M 2200/20* (2013.01); *H01R 4/22* (2013.01); *H01R 11/14* (2013.01)

(56) References Cited

U.S. PATENT DOCUMENTS

| | | | |
|---|---|---|---|
| 5,378,549 A * | 1/1995 | Eylon | H01M 2/1055 429/1 |
| 6,794,596 B2 | 9/2004 | Rhein et al. | |
| 2002/0179571 A1* | 12/2002 | Rhein | H01H 33/6662 218/7 |
| 2004/0144757 A1 | 7/2004 | Rhein et al. | |
| 2009/0016050 A1 | 1/2009 | Opolka | |
| 2010/0177507 A1* | 7/2010 | West | H01M 2/1055 362/183 |

OTHER PUBLICATIONS

PCT/US2017/030635 International Search Report and Written Opinion dated Sep. 18, 2017 (12 pages).

U.S. Appl. No. 15/584,928, filed May 2, 2017 entitled "Recloser Battery Assembly With Torque-Limiting Cap".

U.S. Appl. No. 15/584,932, filed May 2, 2017 entitled "Recloser Battery Assembly With Hot Stick Adaptor and Battery Tube Adaptor".

* cited by examiner

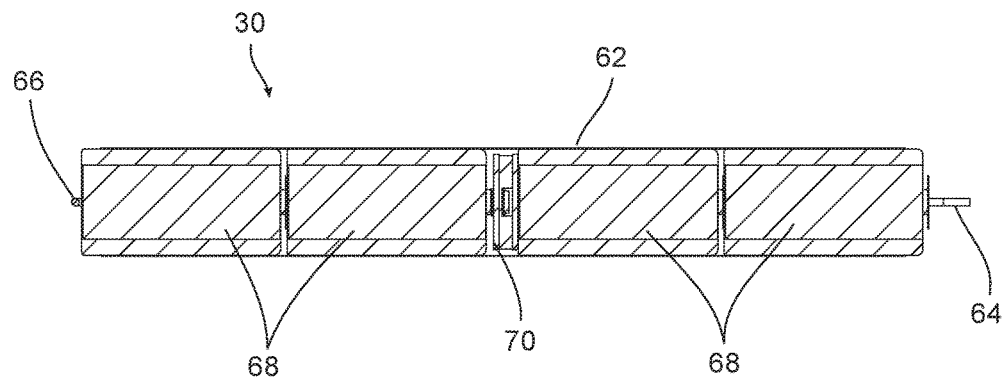
FIG. 8
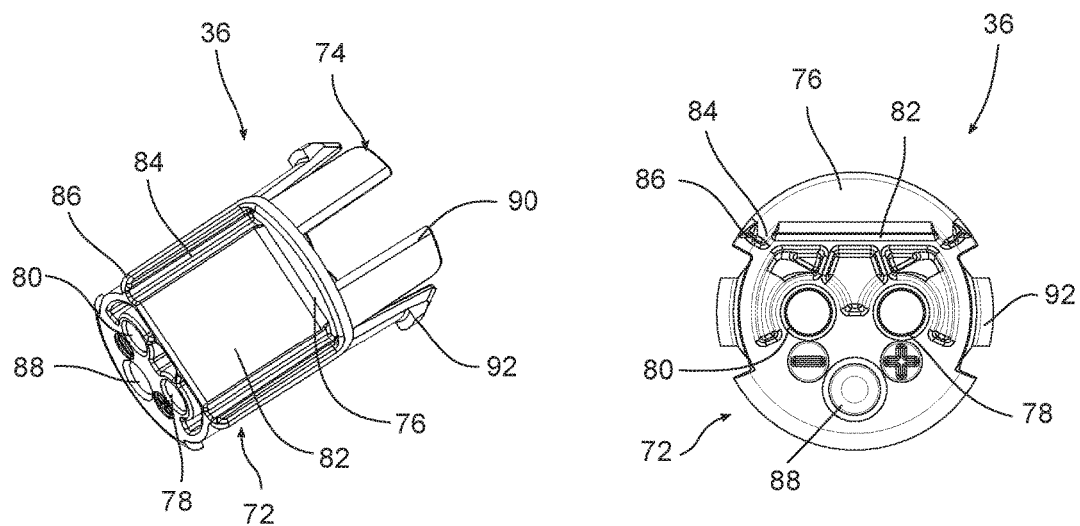
FIG. 9                    FIG. 10

RECLOSER BATTERY ASSEMBLY

RELATED APPLICATION(S)

This application is based on U.S. provisional application Ser. No. 62/330,355, filed May 2, 2016, the disclosure of which is incorporated herein by reference in its entirety and to which priority is claimed.

FIELD

Various exemplary embodiments relate to a battery assembly for a utility line circuit interrupter such as a recloser.

BACKGROUND

Conventional circuit interrupting devices, such as circuit breakers, and reclosers, provide protection for power distribution systems and the various apparatus on those power distribution systems by isolating a faulted section from the upstream power source in the system. Fault current, or momentary current surges, in the system can occur under various conditions, including lightning, an animal or tree contacting the power lines, or adjacent power lines contacting each other. For example, windy conditions often cause power lines strung between poles to swing, thereby momentarily touching each other or a grounded conductor. These types of transitory events cause momentary power line short circuits that in turn cause fuses to burn out or circuit breaker to trip.

Most of the faults occurring on a line are transient faults, as opposed to permanent faults, and do not require permanent protection. Therefore, reclosers are a common solution for clearing these types of transient faults without causing a permanent power outage. Reclosers are typically mounted to support structures in electrical power distribution systems to provide continuous electrical service up to a programmed current threshold. Reclosers detect faults, i.e., overcurrent events past the programmed threshold, and interrupt the load current when the overcurrent event persists for a predetermined amount of time which is determined by the overcurrent value. If the recloser operates and temporarily interrupts the load current, it will automatically restore service after the transient fault condition is gone. If a fault is permanent, the recloser locks out, i.e., permanently opens the circuit, after a preset number of operations, thereby isolating the faulted section of the system.

SUMMARY

According to an exemplary embodiment, a circuit interrupting device for use within a power distribution system includes a housing containing a circuit interrupting mechanism. A battery tube is positioned in the housing. A battery assembly is configured to be inserted into the battery tube. The battery assembly includes a battery assembly body having a first end and a second end. A battery is positioned within the battery assembly body. A positive contact is electrically connected to the battery and is exposed from the second end of the battery assembly body. A negative contact is electrically connected to at least one of the one or more batteries and exposed from the second end of the battery assembly body.

According to another exemplary embodiment, a circuit interrupting device for use within a power distribution system includes a housing containing a circuit interrupting mechanism. A battery tube is positioned in the housing. The battery tube has a first mating feature, a first positive contact, and a first negative contact. A battery assembly is configured to be inserted into the battery tube. The battery assembly includes a second mating feature configured to mate with the first mating feature, a second positive contact, and a second negative contact. The first and second mating features ensure a proper alignment of the battery assembly in the battery tube to electrically connect the first and second positive contact and electrically connect the first and second negative contacts.

According to another exemplary embodiment, a circuit interrupting device for use within a power distribution system includes a housing containing a circuit interrupting mechanism. A battery tube is positioned in the housing. A battery assembly is configured to be inserted into the battery tube. The battery assembly includes a battery assembly body having a first end and a second end and a keyed body portion. A battery is positioned in the battery assembly body. A cap is connected to the first end of the battery assembly body. A contact casing is connected to the second end of the battery assembly body. The contact casing has a casing keyed portion aligned with the keyed body portion. A positive contact is electrically connected to the battery and at least partially positioned in the contact casing. A negative contact is electrically connected to the battery and at least partially positioned in the contact casing.

BRIEF DESCRIPTION OF THE DRAWINGS

The aspects and features of various exemplary embodiments will be more apparent from the description of those exemplary embodiments taken with reference to the accompanying drawings, in which:

FIG. 8 is a side, sectional view of an exemplary battery assembly;

FIG. 9 is a rear perspective view of an exemplary contact casing;

FIG. 10 is a rear view of FIG. 9;

DETAILED DESCRIPTION OF EXEMPLARY EMBODIMENTS

Figure 1:
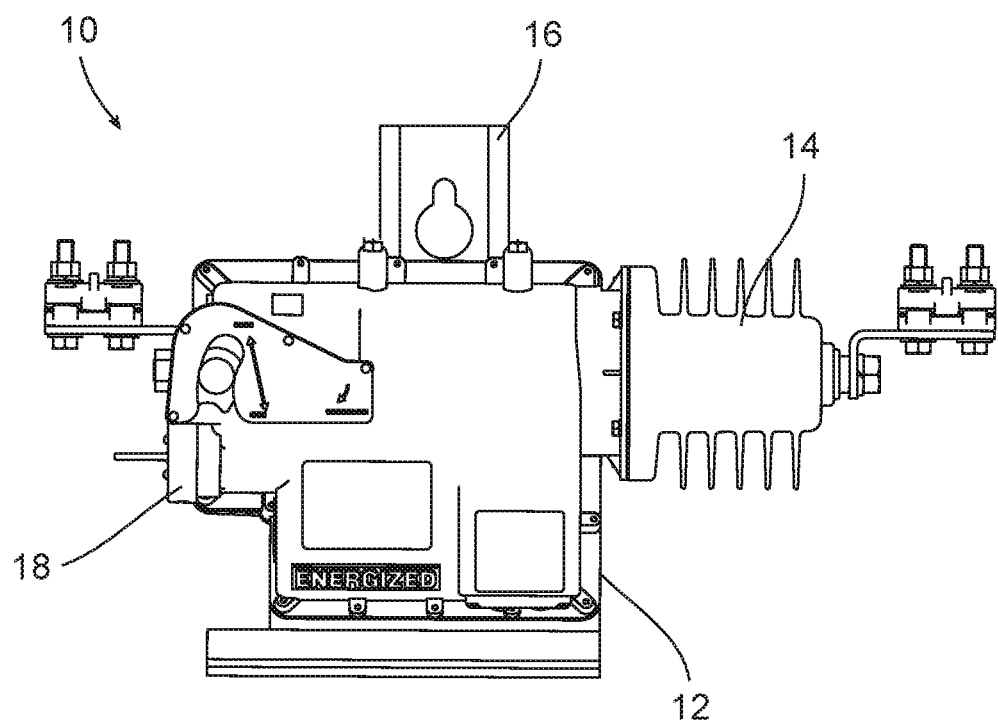
FIG. 1 is a front view of an exemplary automatic recloser.

FIG. 1 shows, a circuit interrupting device for a power distribution system, such as an automatic recloser 10, although certain aspects of the circuit interrupting device can be incorporated into other circuit interrupting devices, such as circuit breakers that do not reclose. The recloser 10 generally includes a housing 12 containing a circuit interrupting mechanism 14 used in conjunction with an actuator, which is electrically controlled by an electronic control assembly. The circuit interrupting mechanism 14 is preferably a vacuum interrupter, but can be any type of interrupting means such as SF6 gas interrupter or a solid dielectric interrupter. The actuator is preferably a solenoid, but may be any known electrical or mechanical actuating or operating mechanism. The recloser 10 can include a mounting bracket 16 for mounting the housing 12 to a utility pole or other structure.

A battery 18 can be used, for example, as a power source for the electronic control assembly in order to close the vacuum interrupter contacts, such as when initially installing the recloser 10 and after lock-out due to a permanent fault. The battery 18 can be used for other purposes as well, such as powering peripheral devices coupled to the recloser or providing power to external indicators, such as external visual indicators. The battery 18 is received within the housing 12 and removably secured thereto. Additional components and operation of the recloser 10 as understood by one of ordinary skill in the art are further described in U.S. Pat. No. 6,794,596, which is hereby incorporated by reference in its entirety.

Figure 2:
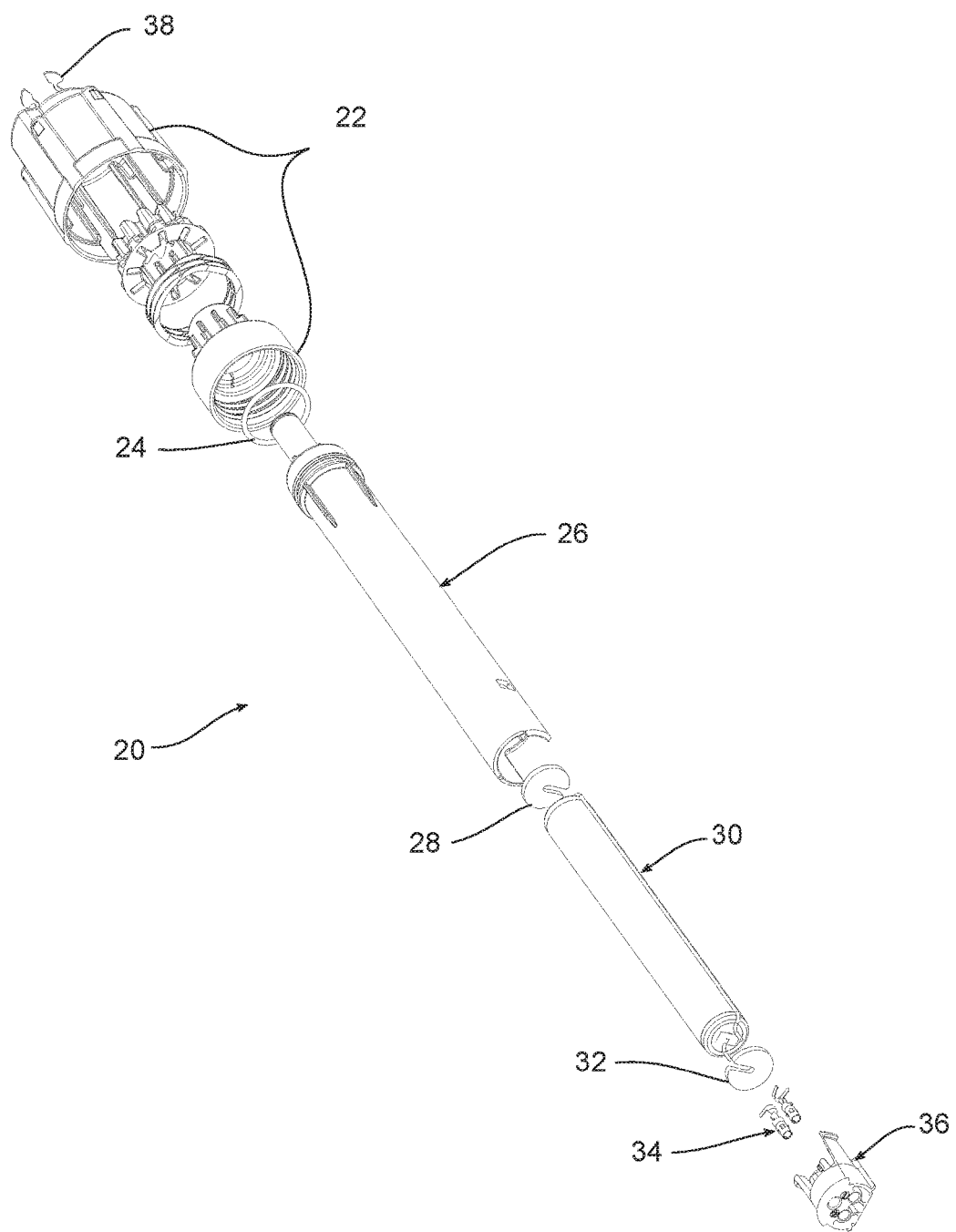
FIG. 2 is an exploded view of an exemplary battery assembly for use with a recloser.
Figure 3:
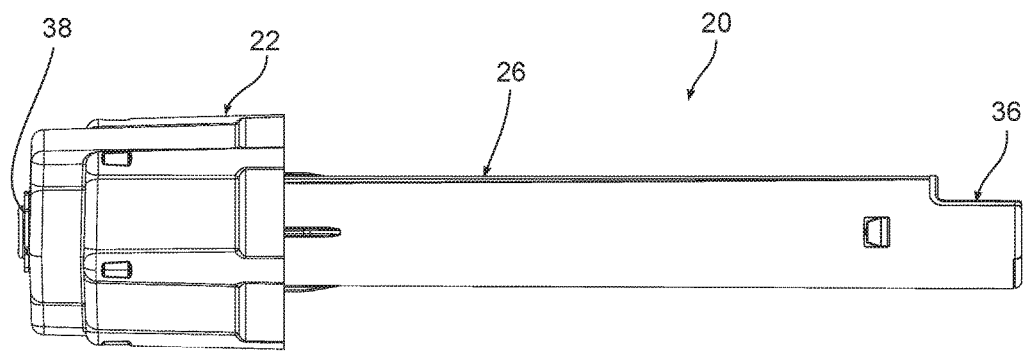
FIG. 3 is a side view of the assembled battery assembly.
Figure 4:
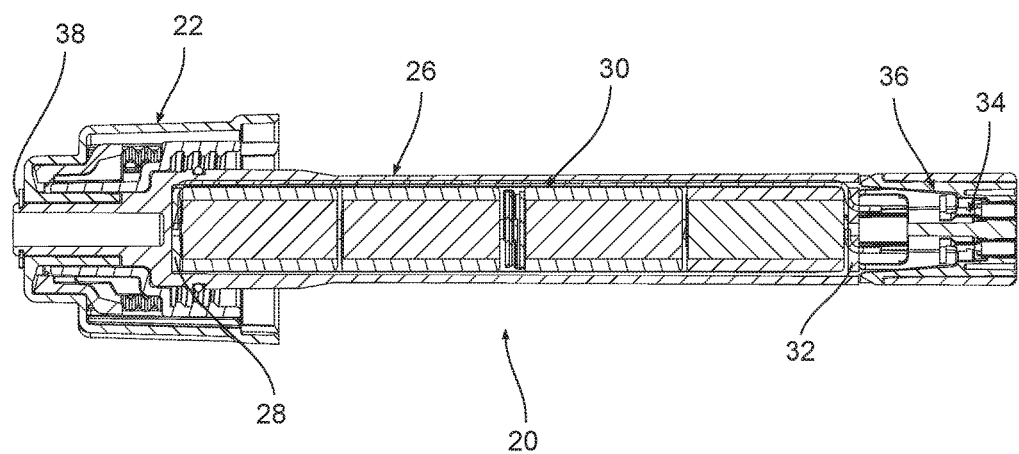
FIG. 4 is a side, sectional view of the battery assembly rotated 90 degrees from FIG. 3.

FIGS. 2-4 show an exemplary embodiment of a battery assembly 20 that includes a cap assembly 22, a seal (e.g. an O-ring) 24, a battery assembly body 26, a first battery pad 28, a battery 30, a second battery pad 32, a set of contacts 34, and a contact casing 36. When assembled, a portion of the battery assembly body 26 extends through the cap assembly 22 and is held in place by a retainer 38, for example an E-clip. The battery 30 and battery pads 28, 32 are retained in the battery assembly body 26 and the contact casing 36 is connected to the battery assembly body 26.

Figure 5:
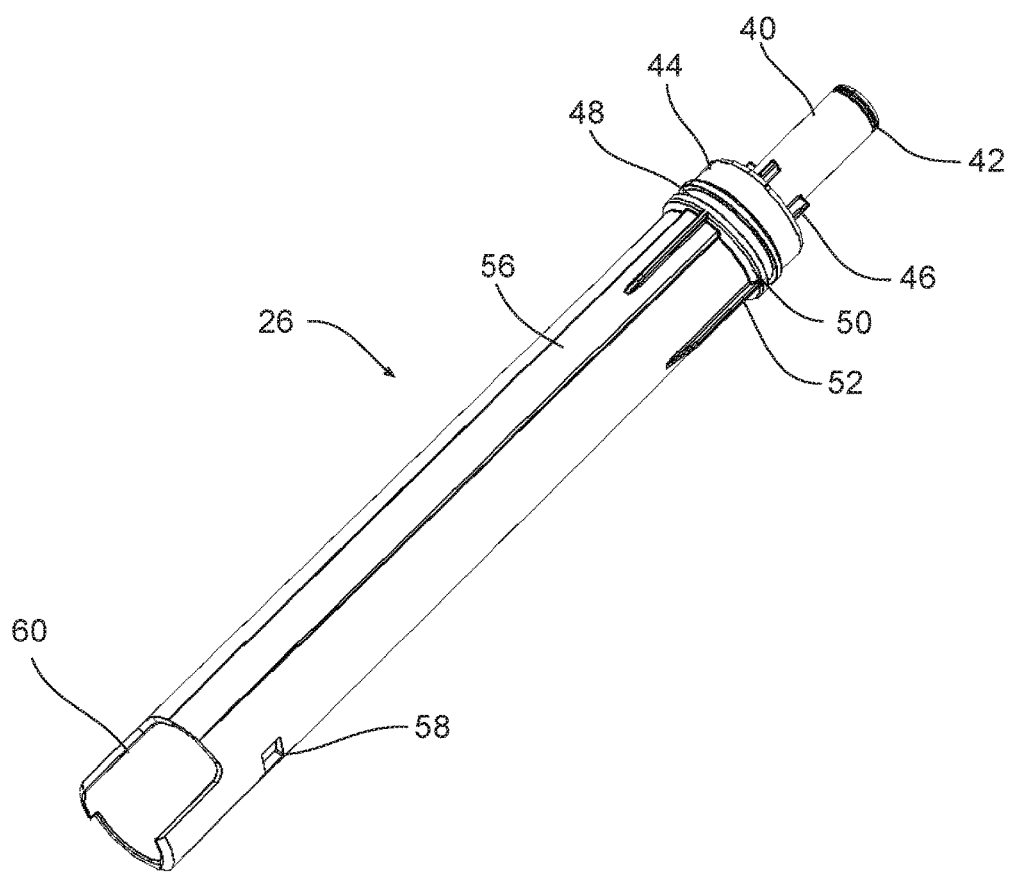
FIG. 5 is a perspective view of an exemplary battery assembly body.
Figure 6:
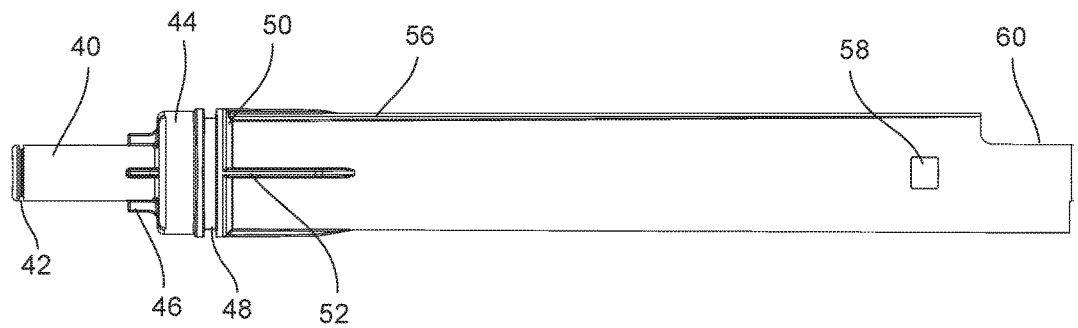
FIG. 6 is a side view of FIG. 5.
Figure 7:
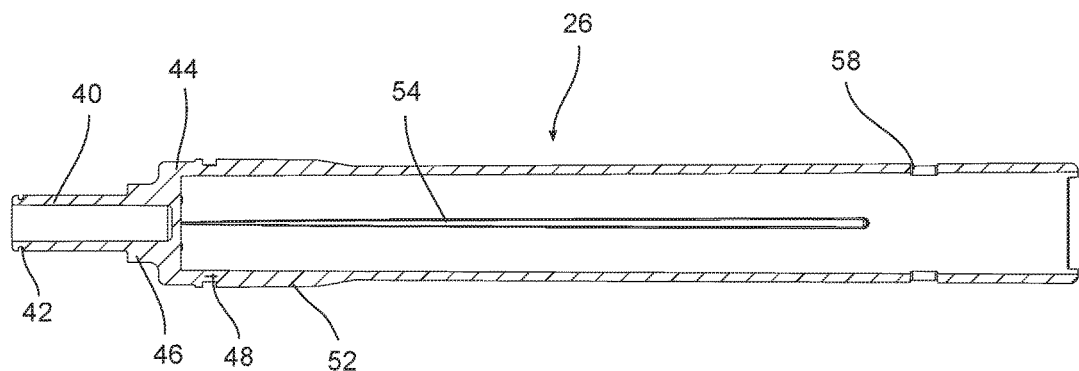
FIG. 7 is a side, sectional view of the battery assembly body rotated 90 degrees from FIG. 6.

FIGS. 5-7 show an exemplary embodiment of a battery assembly body 26 having a front portion that includes a shaft 40 that extends through the cap assembly 22 and includes a first annular groove 42 to receive the retainer 38 (see, FIG. 4). The shaft 40 extends to a base 44 having a width larger than the shaft 40. One or more ribs 46 extend from the base and along a portion of the shaft 40. The ribs 46 provide support to the shaft 40 and engage with the cap 20 and can additionally provide spacing between the cap 20 and the battery assembly body 26. A second annular groove 48 is provided below the base 44 to receive a gasket, for example the O-ring 24 shown in FIG. 2.

A middle portion of the battery assembly body 26 includes a flange 50 positioned proximate the second annular groove 48 shown in FIG. 5. One or more ribs 52 extend from the flange 50 along the battery assembly body 26. As previously mentioned, the ribs 52 can provide support for the battery assembly body 26 and help to space the battery assembly body 26 from a housing, such as when the battery assembly body 26 is placed in a battery tube in a recloser 10. The middle portion of the battery assembly body 26 receives the battery 30. As shown in FIG. 7, the interior of the battery assembly body 26 includes a longitudinal groove 54 for receiving a portion of the battery 30 as explained below. In various exemplary embodiments, a keyed protrusion 56 can be provided on an outer surface of the battery assembly body 26, as best shown in FIGS. 5 and 6. The keyed protrusion 56 is raised from the major outer surface of the battery assembly body 26 and has a different cross section.

As shown in FIG. 6, a rear portion of the battery assembly body 26 includes one or more openings 58. The openings 58 receive a portion of the contact casing 36 to securely fasten the contact casing 36 to the battery assembly body 26, for example to provide a snap-fit connection that still allows the contact casing 36 to be removed if desired. Two openings 58 are shown here, although fewer or more openings 58 can be used depending on the desired connection. One end of the battery assembly body 26 also includes a keyed portion 60 that has a different cross section (for example a flat portion) that can assist with proper alignment of the battery assembly 20 during installation. The keyed portion 60 may include grooves, extruded portions, or a different key configuration in other embodiments.

FIG. 8 shows an exemplary embodiment of the one or more batteries 30 that includes an outer casing 62, a positive lead 64, and a negative lead 66. The negative lead 66 extends outside of the casing and is received in the longitudinal groove 54 in the battery assembly body 26. In one exemplary configuration, the one or more batteries 30 are formed from two sets of two lithium ion cell batteries 68 separated by a poly-switch fuse assembly 70. In other embodiments, different types of batteries and/or configurations can be utilized.

FIGS. 9-12 show an exemplary embodiment of the contact casing 36. The contact casing 36 includes a rear portion 72 that is positioned adjacent to and the outer wall of the battery assembly body 26 and a front portion 74 that extends into the battery assembly body 26. As shown in FIG. 9, a semicircular wall 76 partially separates the front portion 74 from the rear portion 72.

The rear portion 72 includes a positive terminal opening 78 and a negative terminal opening 80 provided in an outer face of the contact casing 36. The contact casing 36 also includes a keyed portion 82 that aligns with the keyed portion 60 of the battery assembly body 26. In one embodiment, the keyed portion 82 includes a flat surface that is bound by a pair of channels or grooves 84. Tabs 86 extend upwardly from the grooves 84. The combination of the tabs 86 and grooves 84 allow for proper alignment and a secure fit into the battery assembly body 26. A lower opening 88 is positioned below the positive and negative terminal openings 78, 80. As shown in FIG. 10, the lower opening 88 has a substantially cylindrical configuration, although other shapes and configurations can be used. For example, different rectilinear or curvilinear shapes can be used. The mouth of the lower opening 88 can be wider or substantially funnel-shaped to help provide alignment with a mating protrusion.

Figure 11:
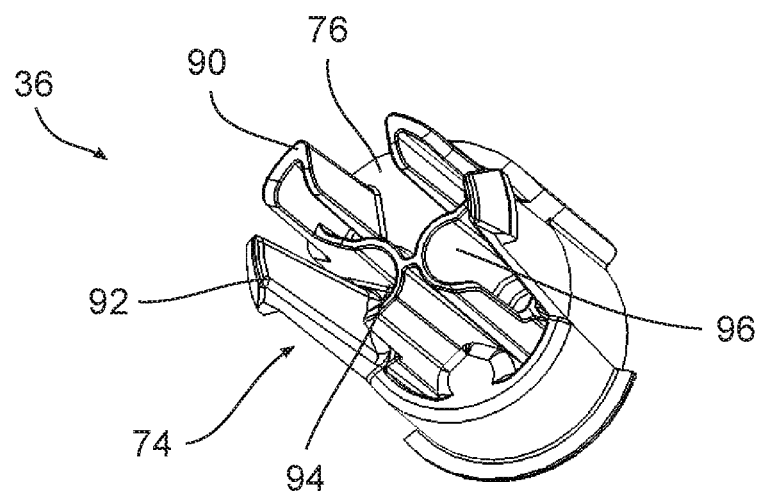
FIG. 11 is a front perspective view of FIG. 9.
Figure 12:
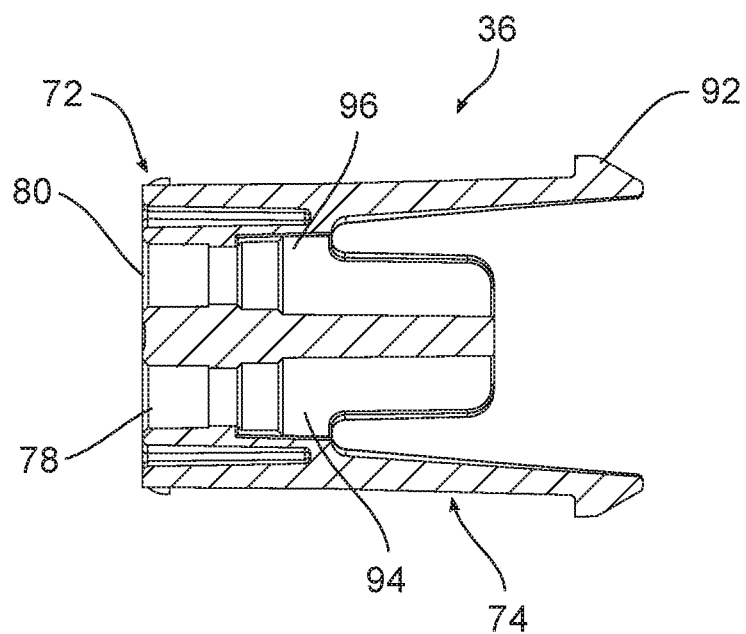
FIG. 12 is a top, sectional view of FIG. 9.

The front portion 74 includes a set of protrusions 90 that extend from the circular wall 76 as shown in FIG. 11. One or more cantilevered arms 92 having a hook member are used to connect the contact casing 36 to the battery assembly body 26. The cantilevered arms 92 form a detent, such as a releasable snap-fit connection, although other connections can be used. As illustrated in FIG. 12, a positive conduit 94 and a negative conduit 96 extend to the positive terminal opening 78 and the negative terminal opening 80, respectively. The contacts 34 (see, FIG. 4) are connected to respective battery leads through a conductor and extend into the respective conduits 94, 96 and are exposed through the respective terminal openings 78, 80 when the contact casing 36 is affixed to the battery assembly body 26.

Figure 13:
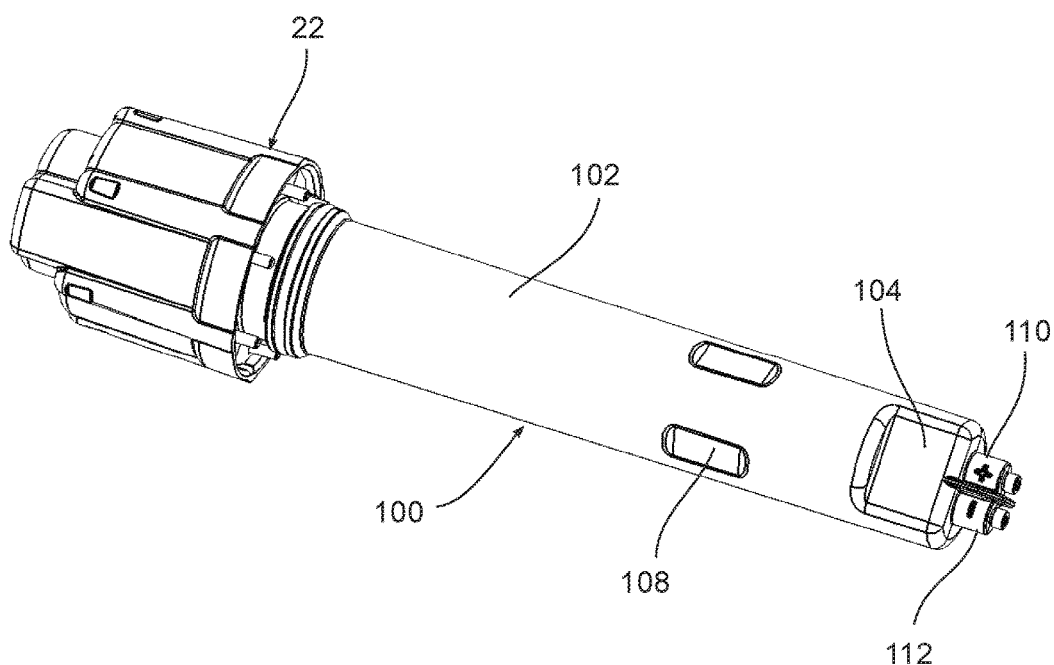
FIG. 13 is a side view of the battery assembly connected to an exemplary battery tube.

According to an exemplary embodiment, the assembled battery assembly 20 is inserted into a battery receptacle, or tube 100 coupled to the recloser 10. FIG. 13 shows an exemplary battery tube 100 that includes a substantially cylindrical body 102 for receiving the battery assembly body 26. The battery tube 100 is shown separately from the recloser housing 12 for clarity. In some embodiments, the battery tube 100 is separable from the housing 12 or formed integrally within the housing 12.

Figure 14:
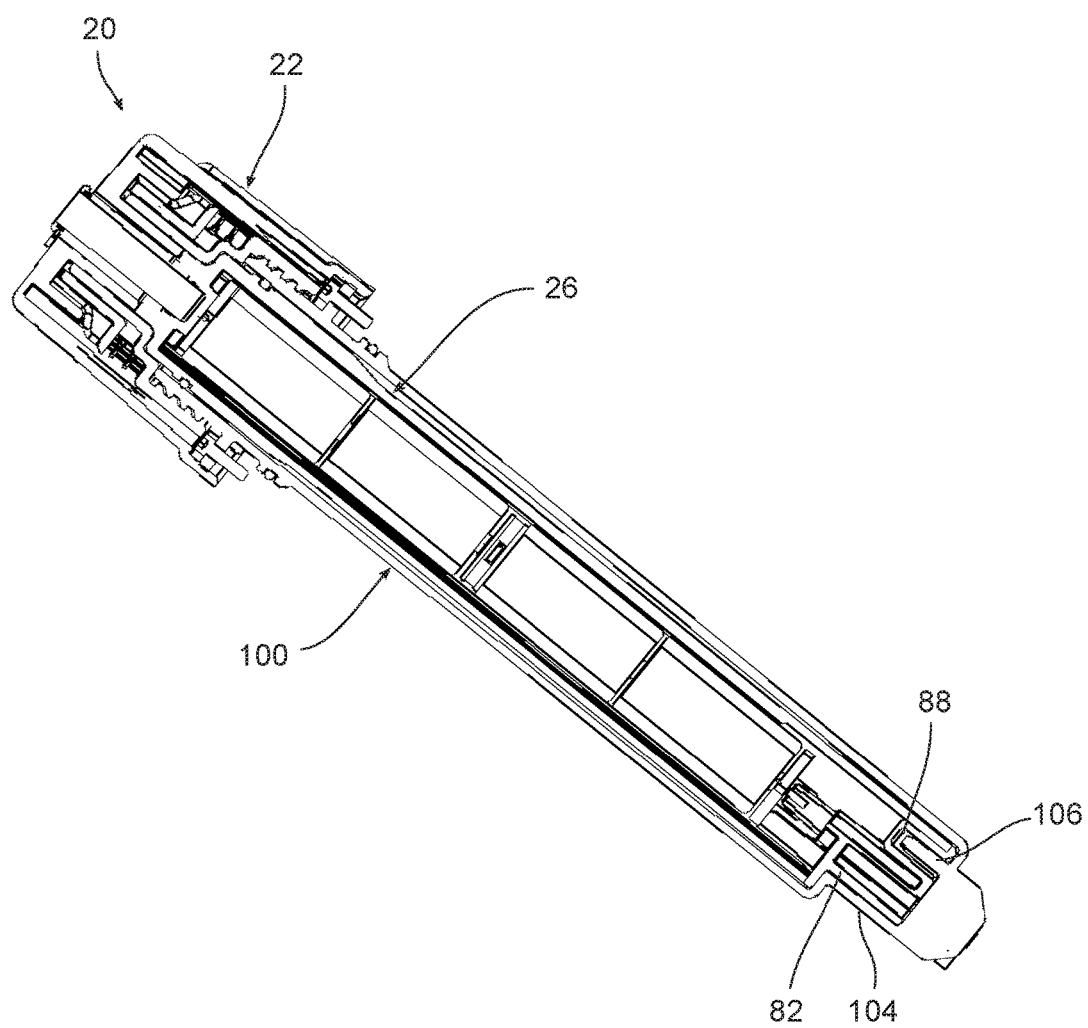
FIG. 14 is a side, sectional view of the battery assembly connected to an exemplary battery tube as shown in FIG. 13.

The cylindrical body 102 includes a keyed portion 104 that mates with the keyed portion 60 of the battery assembly body 26 and the keyed portion 82 of the contact casing 36. A protrusion 106 extends from a wall of the battery tube 100 that mates with or otherwise extends into the lower opening 88 of the contact casing 36 as shown in FIG. 14. A groove or channel can also be provided in the battery tube 100 to receive the keyed protrusion 56. In an exemplary embodiment illustrated in FIG. 13, the groove or channel is at least partially defined by a pair of indents 108 formed in the battery tube 100. The battery tube 100 can also include, or be connected to, a positive contact 110 and a negative contact 112 that electrically connect to the contacts 34 of the battery battery assembly 20. For example, a positive pin and a negative pin can extend into the positive terminal opening 78 and the negative terminal opening 80, respectively, and connect to the positive and negative contacts 34.

Typically, batteries used for reclosers must be carefully and specifically positioned by an installer to place the battery contacts in a correct alignment. This is dangerous for an installer who is under hazardous conditions due to the potential for electrocution and exposure to harsh weather elements. The keyed portions of the battery assembly 20 eliminate the difficulties in aligning the battery battery assembly in the battery tube 100. The keyed portions also help prevent unwanted rotation and ensure a secure fit of the battery battery assembly 20 in the battery tube 100 while in use, which can be caused by, e.g., vibrations in the recloser 10, line current, recloser operations, or environmental conditions such as wind or thermal fluctuations. Also, typical utility line circuit interrupter batteries do not include both positive and negative contacts at a single end, which helps provide an easier connection and alignment. Although a particular shape and configuration is shown for the mating keyed portions, other shapes and configurations can be used that provide a mating alignment in a particular orientation that allows for easier installation of the battery assembly 20.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A circuit interrupting device for use with a power distribution system, comprising: a housing containing a circuit interrupting mechanism; a battery tube coupled to the housing; and a battery assembly configured to be inserted into the battery tube, the battery assembly comprising, a battery assembly body having a first end and a second end, a battery positioned in the battery assembly body, a positive contact electrically connected to the battery and exposed from the second end of the battery assembly body, and a negative contact electrically connected to the battery and exposed from the second end of the battery assembly body;
    wherein the battery assembly includes a first keyed portion that is configured to mate with a second keyed portion of the battery tube.

2. The circuit interrupting device of claim 1, wherein the battery assembly body has a substantially cylindrical configuration and the keyed portion includes a flattened section at the second end of the battery assembly body.

3. The circuit interrupting device of claim 1, wherein the keyed portion includes a projection extending along at least a portion of the battery assembly body, wherein the projection has a cross-sectional shape different from a major outer surface of the battery assembly body.

4. The circuit interrupting device of claim 1, wherein the battery assembly body has a substantially cylindrical configuration.

5. The circuit interrupting device of claim 1, wherein the battery tube includes a projection extending from a rear wall into the tube and the battery assembly includes an opening configured to receive the projection.

6. The circuit interrupting device of claim 1, wherein a contact casing is connected to the second end of the battery assembly body.

7. A circuit interrupting device for use with a power distribution system, comprising:
    a housing containing a circuit interrupting device;
    a battery tube coupled to the housing, the battery tube having a first mating feature, a first positive contact, and a first negative contact; and
    a battery assembly configured to be inserted into the battery tube, the battery assembly including a second mating feature configured to mate with the first mating feature, a second positive contact, and a second negative contact,
    wherein the first and second mating features ensure a proper alignment of the battery assembly in the battery tube, and
    wherein the proper alignment facilitates the electrical connection between the first and second positive contacts and electrically connect the first and second negative contacts.

8. The circuit interrupting device of claim 7, wherein the first mating feature includes a first keyed portion and the second mating feature includes a second keyed portion.

9. The circuit interrupting device of claim 8, wherein the battery tube includes a third mating feature, and wherein the battery assembly includes a fourth mating feature.

10. The circuit interrupting device of claim 9, wherein the third mating feature includes a projection and the fourth mating feature includes an opening configured to receive the projection.

11. The circuit interrupting device of claim 7, wherein the battery assembly includes a battery assembly body, a cap connected to a first end of the battery assembly body, and a contact casing connected to a second end of the battery assembly body.

12. A circuit interrupting device for use with a power distribution system, comprising:
- a housing containing a circuit interrupting mechanism;
- a battery tube coupled to the housing; and
- a battery assembly configured to be inserted into the battery tube, the battery assembly comprising,
  - a battery assembly body having a first end, a second end, and a body keyed portion,
  - a battery positioned in the battery assembly body,
  - a cap connected to the first end of the battery assembly body,
  - a contact casing connected to the second end of the battery assembly body and having a casing keyed portion aligned with the body keyed portion,
  - a positive contact electrically connected to the battery and at least partially positioned in the contact casing, and
  - a negative contact electrically connected to the battery and at least partially positioned in the contact casing.

13. The circuit interrupting device of claim 12, wherein the battery assembly body includes a shaft that extends through the cap and wherein a retainer is connected to shaft external to the cap in order to connect the cap to the battery assembly body.

14. The circuit interrupting device of claim 12, wherein the contact casing includes a detent to connect the contact casing to the battery assembly body.

15. The circuit interrupting device of claim 12, wherein the casing keyed portion mates with a keyed portion of the battery tube.

16. The circuit interrupting device of claim 12, wherein the contact casing includes a positive terminal opening and a negative terminal opening.

17. The circuit interrupting device of claim 12, wherein the at least one battery includes a battery cell positioned in an outer casing having first end facing the cap and a second end facing the contact casing, and wherein a lead extends from the first end of the battery casing to the second end of the battery casing.

18. The circuit interrupting device of claim 17, wherein a groove is formed in the battery assembly body to receive the lead.

19. The circuit interrupting device of claim 12, wherein the battery assembly body includes a projection extending along at least a portion of the battery assembly body, wherein the projection has a cross-sectional shape different from a major outer surface of the battery assembly body.

* * * * *